United States Patent [19]

Sharma et al.

[11] Patent Number: 5,268,934
[45] Date of Patent: Dec. 7, 1993

[54] ASYNCHRONOUS-TO-SYNCHRONOUS CONVERTER

[75] Inventors: Raghu Sharma, North Oaks; Greg Johnson, Fridley, both of Minn.

[73] Assignee: Multi-Tech Systems, Inc., Mounds View, Minn.

[21] Appl. No.: 783,571

[22] Filed: Oct. 28, 1991

[51] Int. Cl.⁵ .......................................... H04L 25/38
[52] U.S. Cl. ...................................................... 375/117
[58] Field of Search ............ 235/466; 370/24, 56, 370/84, 91, 103; 375/41, 48, 96, 106, 109, 110, 118, 117

[56] References Cited

U.S. PATENT DOCUMENTS

| | | | |
|---|---|---|---|
| 3,809,820 | 5/1974 | Sullivan | 370/84 |
| 3,937,882 | 2/1976 | Bingham | 370/24 |
| 4,048,440 | 9/1977 | Peck et al. | 178/69.1 |
| 4,586,189 | 4/1986 | Tyrrell | 370/48 |
| 5,054,020 | 10/1991 | Meagher | 375/117 |

OTHER PUBLICATIONS

Exhibit A-blueprint of 1200 band transmitter (2 pps.).
Exhibit B-blueprint of 1200 band receiver (2 pages).
Exhibit C-blueprint of 1200 band receiver (2 pages).
Exhibit D-blueprint of 1200 band transmitter (2 pages).
Exhibit E-blueprint of transmitter and receiver (3 pages).

Primary Examiner—Curtis Kuntz
Assistant Examiner—Don N. Vo
Attorney, Agent, or Firm—Merchant, Gould, Smith, Edell, Welter & Schmidt

[57] ABSTRACT

Formatted serial asynchronous character data is converted to serial synchronous data, where the intra-character bit rate of the serial asynchronous data and the synchronous bit rate of the serial synchronous data are different. The character data utilizes a start bit - stop bit format which enables the converter to drop or add stop bits occasionally in proportion to the bit rate difference, thus compensating for bit rate mismatch.

4 Claims, 9 Drawing Sheets

START DETECTOR

BIT COUNTER CLOCK

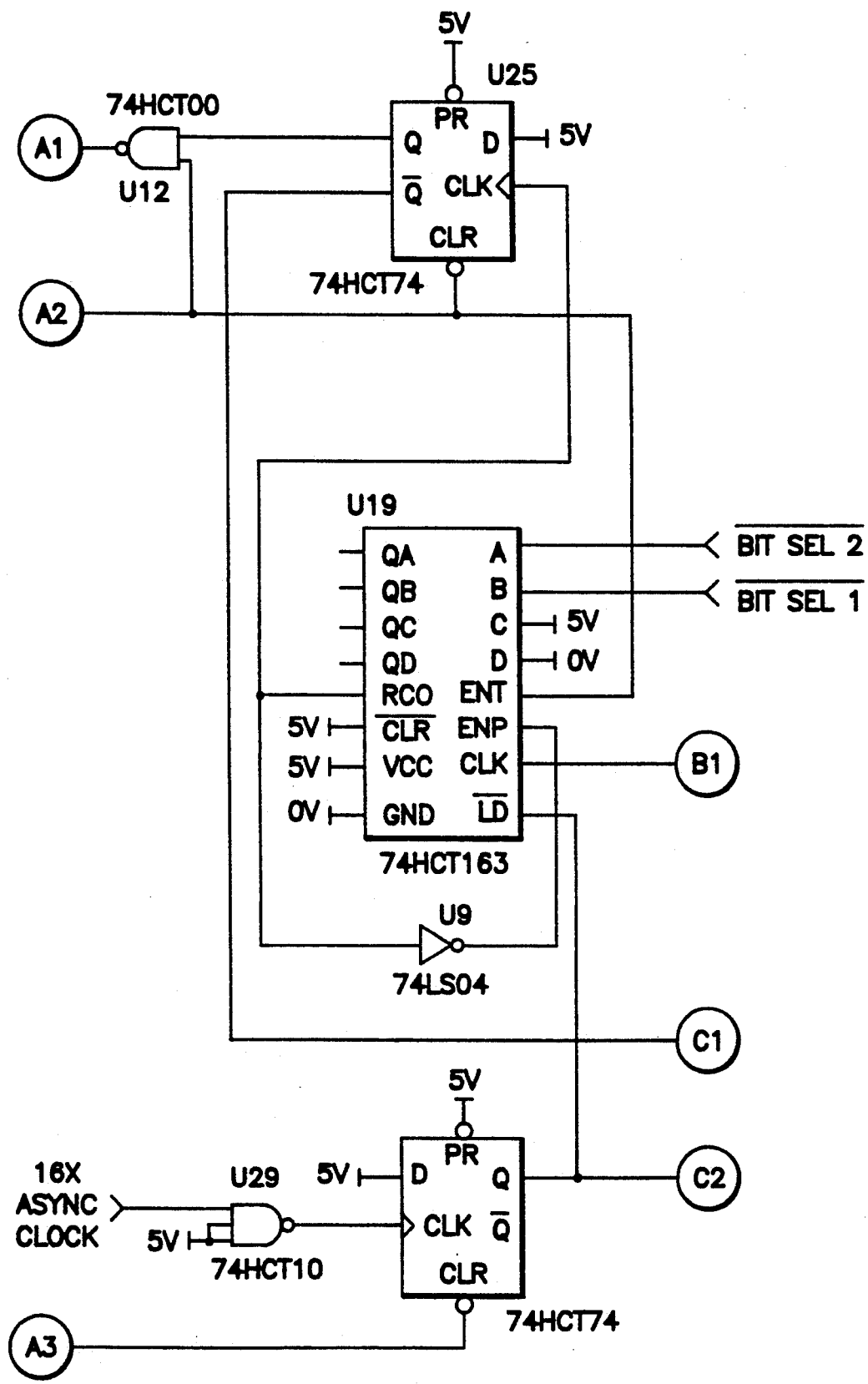
FIG. 2C   ASYNC BIT COUNTER

ASYNC DATA SAMPLER

DATA READY FLAG

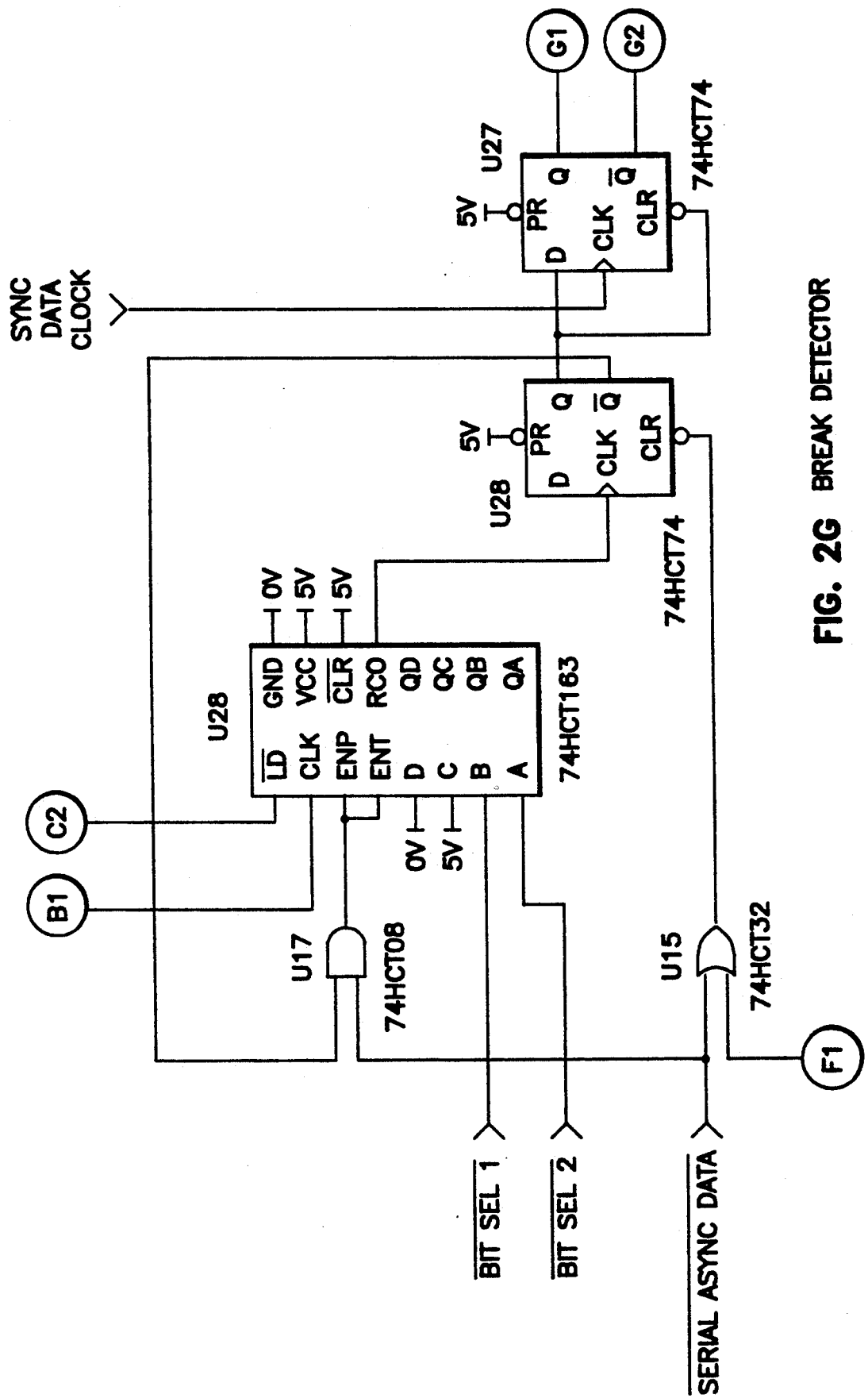
FIG. 2G BREAK DETECTOR

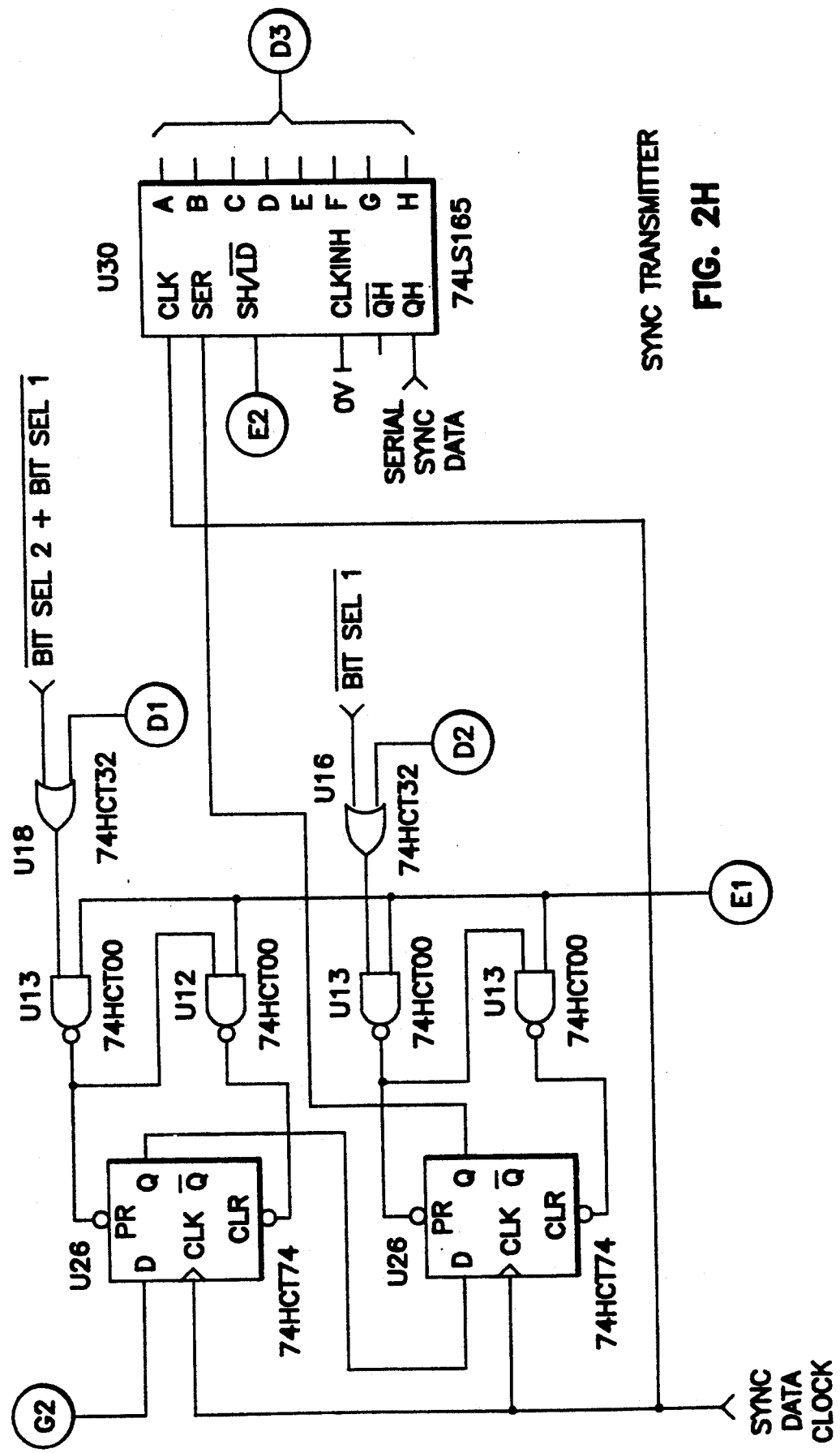
FIG. 2H SYNC TRANSMITTER

ASYNCHRONOUS-TO-SYNCHRONOUS CONVERTER

FIELD OF THE INVENTION

This invention relates to data communication systems, specifically to the interfacing and conversion of serial asynchronous digital data to serial synchronous digital data.

BACKGROUND OF THE INVENTION

Serial digital data communication is broadly divided into two classes of operation: synchronous and asynchronous. Synchronous digital data communication refers to the transfer of system clocked digital data. It occurs when the digital data being transferred must conform to specific system timing constraints and boundaries, which partition the digital data into referenced intervals of time. Any transition of the digital data must occur at these boundaries. Asynchronous digital data communication refers to the transfer of digital data which does not adhere to the specific system timing constraints and boundaries and may be clocked or unclocked digital data.

Synchronous digital data is used most commonly in communication systems and information and data processing systems. Communication systems usually employ a method for synchronizing to a known information exchange rate. Information and data processing systems utilize synchronous digital data to control the flow of information, data, and events which ensures an orderly execution of various operations and logical decisions. Synchronous systems used in serial digital data communications produce a stream of data at a fixed clock rate, where the clock controls not only the data timing within a character, but also the character-to-character timing as well.

Asynchronous digital data is commonly used in control systems where the orderly execution of operations is controlled by a number of completion and initiation signals, often termed "handshaking". The completion signal of one set of operations will initiate the next consecutive set of operations. Asynchronous protocols used in serial digital data communications treat each character as a different message, and the characters appear in the data stream at arbitrary relative times. Within each character however, the data information (bits) is transmitted at a fixed predetermined clock rate. The protocols are actually synchronous within a character and asynchronous between characters, but they are called asynchronous, since the timing between characters is their distinguishing characteristic.

Conversion of asynchronous digital data to and from synchronous digital data is frequently performed when the synchronous intracharacter bit rate of the asynchronous digital data matches the synchronous digital data rate within tolerable limits. However, when the difference between the intracharacter bit rate of the asynchronous digital data and the synchronous digital data rate exceed tolerable limits, specialized circuits and data formats or protocols must be incorporated, such as the Asynchronous-to-Synchronous Data Concentration System presented in U.S. Pat. No. 4,048,440.

As described here and below, the present invention provides enhancements to the Asynchronous-to-Synchronous Data Concentration System presented in U.S. Pat. No. 4,048,440, exemplified by the increased tolerance to bit rate mismatch and programmable character length selection. Also, the invention can be implemented using total digital design architecture enabling gate array integrated circuit implementation.

SUMMARY OF THE INVENTION

The present invention provides a character length programmable asynchronous-to-synchronous converter. A start detector means provides for asynchronous start bit recognition. Clock pulses for sampling and counting the asynchronous data bits are provided by a bit counter clock. Asynchronous bit counter means provides for asynchronous character separation control by counting each sampled asynchronous data bit. Asynchronous data bit latching and character storing is provided by an asynchronous data sampler. Data ready flag means provides for communication between asynchronous control and synchronous control. Logical switching and routing of the serial asynchronous data and character length selection bits, based on character length selection, are provided by logic steering gates. Break detector means provides for break recognition, and timing for break extension is provided by a break extender. Interfacing between asynchronous character data and serial synchronous data bit communication is provided by a synchronous transmitter. Gate means provides the break detector means with a switch to lock synchronous communications to a low (zero or space) immediately upon detection of a "break" and resume synchronous communications after a break extension.

BRIEF DESCRIPTION OF THE DRAWINGS

The operational enhancements and features of this invention become more apparent from a consideration of the drawings and following detailed description.

FIGS. 2A-H form a detailed schematic of the asynchronous-to-synchronous converter of the present invention.

DETAILED DESCRIPTION OF THE INVENTION

Figure 1:
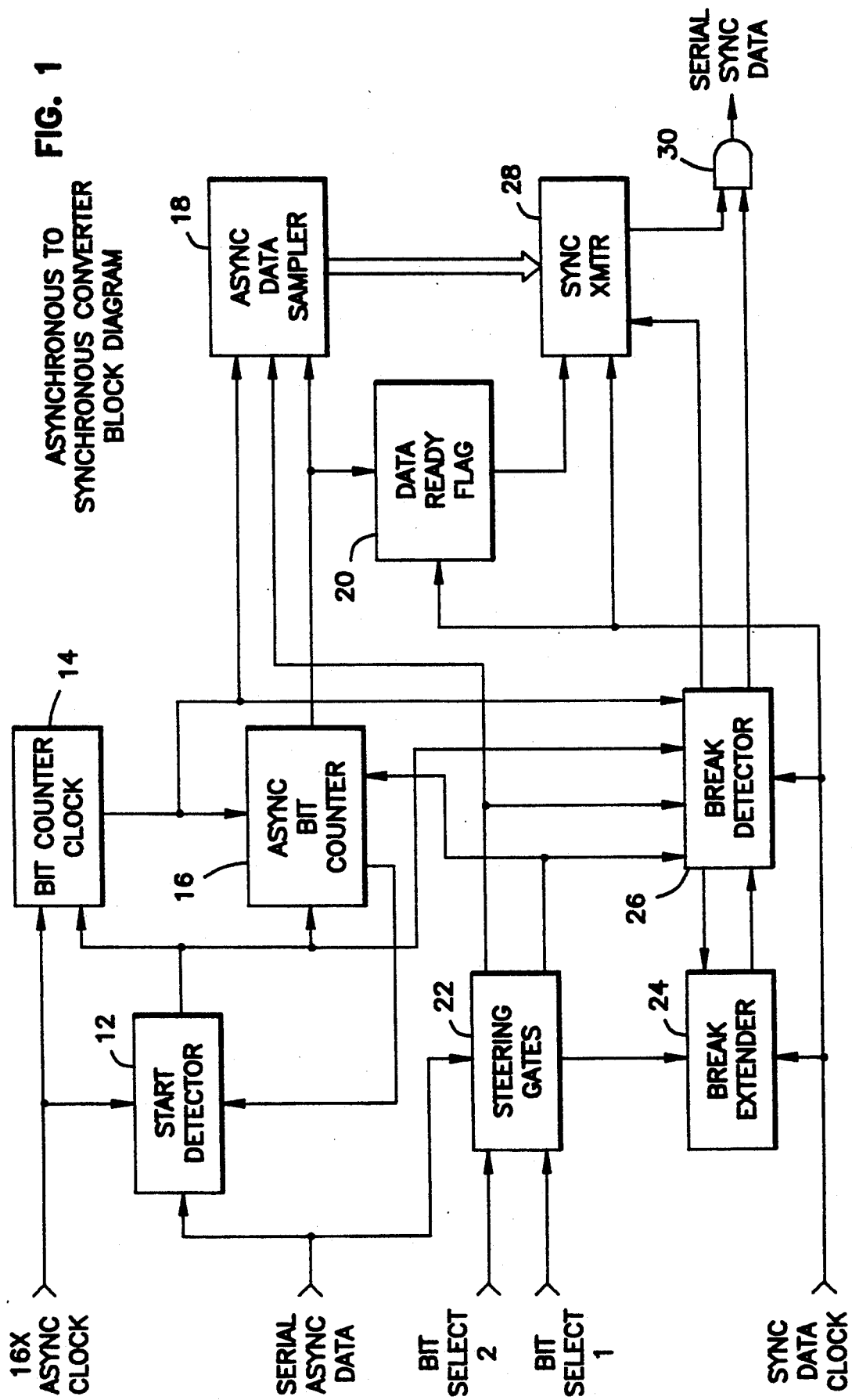
FIG. 1 is a simplified block diagram of the asynchronous-to-synchronous converter of the present invention.

The Asynchronous-to-Synchronous Converter of the present invention is shown in simplified block diagram form in FIG. 1, which displays the required input signals, functional blocks, control and data paths necessary for conversion. Generally, the converter 10 will convert the higher or lower intracharacter bit rate of the serial asynchronous formatted digital data stream to the lower or higher bit rate of the serial synchronous digital data stream respectively. The asynchronous data input must be characterized by a start bit, a predetermined number of data bits (7,8, or 9), and a stop bit. In addition, the converter requires two digital inputs identifying the predetermined number of asynchronous data bits and two clock inputs, a data rate clock for synchronous transmission and a 16X asynchronous data rate clock input. Output from the converter will be a guaranteed start bit followed by the predetermined number of data bits. The stop bit may or may not be present after the data bits. Stop bit transmission frequency will be determined by the ratio of the asynchronous data rate to the synchronous data rate, and will decrease as this ratio increases. A break detector and extender is also included in the converter which monitors the input asynchronous data stream looking for a character consisting of all low bits (zeros or spaces) and missing the stop bit. Upon detection and coincident with the synchronous data rate clock, synchronous transmission will immediately go to a low (zero or space). The break extender will ensure that a minimum predetermined number of zeros will be sent by the converter when a "break" has been detected. This minimum predetermined number of zeros is based on the asynchronous data bit selection.

Operation of converter 10 will be described in more detail below utilizing 57,600 bits/second as the serial asynchronous data baud rate and 56,000 bits/second as the serial synchronous data baud rate; however, the circuit is in no way limited to operation at these speeds.

FIG. 1 is a block diagram representation of the Asynchronous-to-Synchronous Converter, which comprises Start Detector 12, Bit Counter Clock 14, Async Bit Counter 16, Async Data Sampler 18, Data Ready Flag 20, Steering Gates 22, Break Extender 24, Break Detector 26, Sync Transmitter 28, and AND Gate 30.

Serial asynchronous data is fed to Start Detector 12 which monitors the data for a start pulse by sampling the data on each rising transition of the 16X Async Clock. During this time, the serial asynchronous data is also routed, via Steering Gates 22, to Break Detector 26 and Async Data Sampler 18 inputs corresponding with the bit selection inputs to Steering Gates 22.

Start pulse recognition occurs when a low (zero or space) has been sampled on the serial asynchronous data port, thus causing Start Detector 12 to initialize and enable Bit Counter Clock 14, Async Bit Counter 16, and Break Detector 26. Async Bit Counter 16 and Break Detector 26 contain synchronous 4-bit counters whose initial values at this time are determined by the bit selection inputs to Steering Gates 22. Bit Counter Clock 14 also contains a synchronous 4-bit counter that is initialized to a decimal 9 count (1001) at this time. For the given baud rates, the decimal 9 count has been determined to be the optimum initialization value for Bit Counter Clock 14.

Bit Counter Clock 14 will now begin to count the rising transitions of the 16X Async Clock and effectively divide the 16X Async Clock by sixteen. At every clock count of decimal 15 (1111), Bit Counter Clock 14 will provide a clock pulse to Async Bit Counter 16, Async Data Sampler 18, and Break Detector 26. Async Data Sampler 18 will serially shift each asynchronous data bit in for each rising transition of the clock pulse received, while Async Bit Counter 16 counts the rising transitions of the these clock pulses. Break Detector 26 will also count the rising transitions of these clock pulses if at that time, the asynchronous data bit being sampled by Async Data Sampler 18 is a low (zero or space).

Character capture is completed when Async Bit Counter 16 reaches a decimal count of 15 (1111). At this time, Async Data Sampler 18 shift register will contain the start bit, data bits, and stop bit. Async Bit Counter 16 now resets Start Detector 12 and provides Async Data Sampler 18 with the signal to move the character from the shift register to the holding register. Data Ready Flag 20 also senses the signal from Async Bit Counter 16 to Async Data Sampler 18 and will send a transfer command to the Sync Transmitter 28. The next rising transition of the synchronous data clock will trigger the parallel transfer from the holding register in Async Data Sampler 18 to the shift register contained in Sync Transmitter 28. Data Ready Flag 20 will reset on this same synchronous data clock rising transition. Upon receipt of the character, Sync Transmitter 28 will immediately place the most significant bit (start bit) of the character on the input to AND Gate 30 and begin shifting the remaining character bits to AND Gate 30 at the synchronous data clock rate.

The character bits sent from Sync Transmitter 28 to AND Gate 30 will pass through AND Gate 30 as serial synchronous data unless Break Detector 26 has detected a "break", which can be detected as a character containing all lows and no stop bit. Detection occurs if Break Detector 26 reaches a decimal count of 15 (1111) which will be coincident with the decimal count of 15 (1111) reached by Async Bit Counter 16. The next rising transition of the synchronous data clock will cause Break Detector 26 to disable AND Gate 30 thus holding serial synchronous data at a low (zero or space). Break Detector 26 will also at this time hold a low (zero or space) on the serial input to the shift register contained in Sync Transmitter 28 and enable Break Extender 24. The state of AND Gate 30 and Sync Transmitter 28 will be held until Break Extender 24 has counted the required number of rising transitions of the synchronous data clock. The required count is determined by the bit selection bits fed to Break Extender 24, via Steering Gates 22. Once the required count is reached, Break Extender 24 signals Break Detector 26. Break Detector 26 now will enable AND Gate 30 and release the low (zero or space) on the serial input to the shift register contained in Sync Transmitter 28.

Start Detector 12 by now has disabled Bit Counter Clock 14, Async Bit Counter 16, and the counter in Break Detector 26. At this time, the stop bit should still be present on the serial asynchronous data input provided Break Detector 26 did not detect a "break", and Start Detector 12 is prepared to detect the start bit of the next character. Operation of the converter will now repeat as previously described.

The intracharacter bit rate of the serial asynchronous data may vary from the serial synchronous data rate by as much as +5.0% and −5.0%. A faster serial asynchronous data rate is absorbed by occasionally dropping a stop bit out of a current character in the shift register of Sync Transmitter 28. Stop bit deletion will occur when the character transfer is made between Async Data Sampler 18 and Sync Transmitter 28. Each character will contain a start bit, so a missing stop bit can be reinserted by the receiving circuit.

Using 57,600 bits per second for the serial asynchronous data rate yields a conservative 2.86% increase in data rate; however, reliability increases as the difference between the two data rates decreases. Increasing this difference may require changing the initialized value loaded into Bit Counter Clock 14. Changing the initialized value will move the sampling point in each serial asynchronous data bit and may increase reliability of the converter.

FIGS. 2A–2H combine to form a detailed circuit schematic diagram of the preferred embodiment of the present invention. Interconnections between each of FIGS. 2A–2H are labeled with like alphanumeric characters. If there is any ambiguity as between the simplified block diagram of FIG. 1 and FIGS. 2A–2H, the detailed circuit diagram of the latter shall be controlling.

Figure 2A:
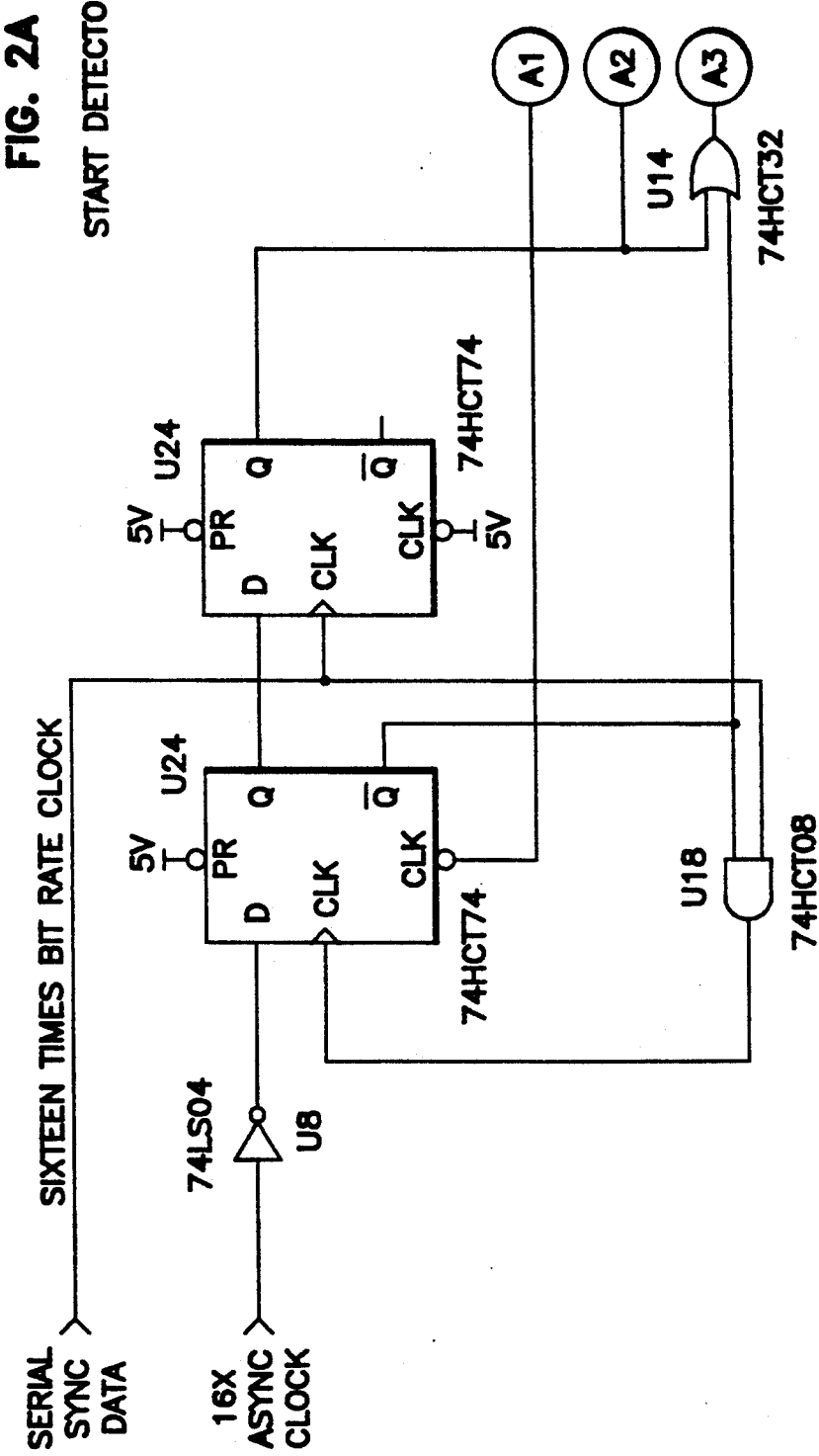

FIG. 2A shows a detailed schematic diagram representation of Start Detector 12, which exhibits the asynchronous start bit recognition function.

Figure 2B:
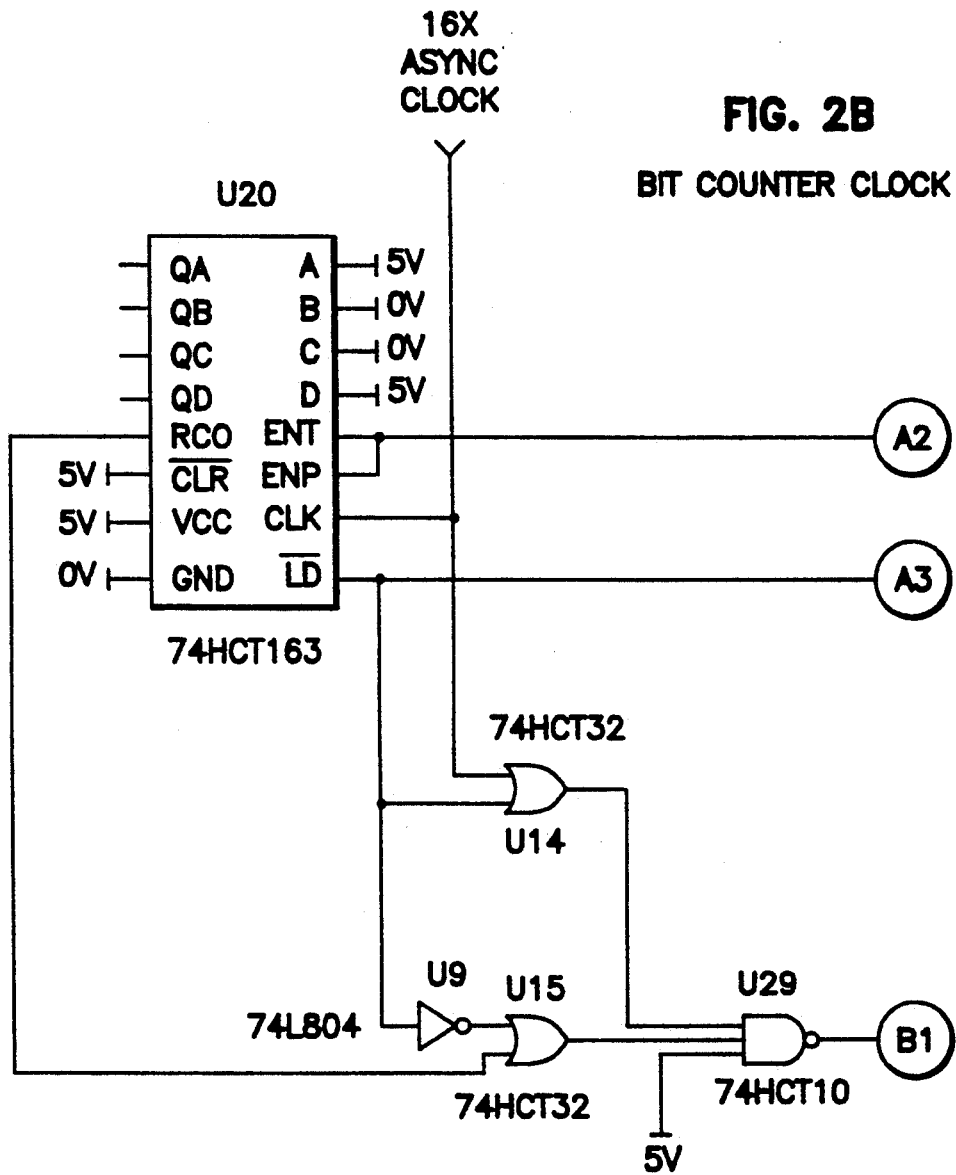

FIG. 2B shows a detailed schematic diagram representation of Bit Counter Clock 14, which exhibits the task of providing clock pulses at the appropriate time and interval for sampling and counting the asynchronous data bits.

FIG. 2C shows a detailed schematic diagram representation of Async Bit Counter 16, which exhibits the function of asynchronous character separation control by counting each sampled asynchronous data bit.

Figure 2D:
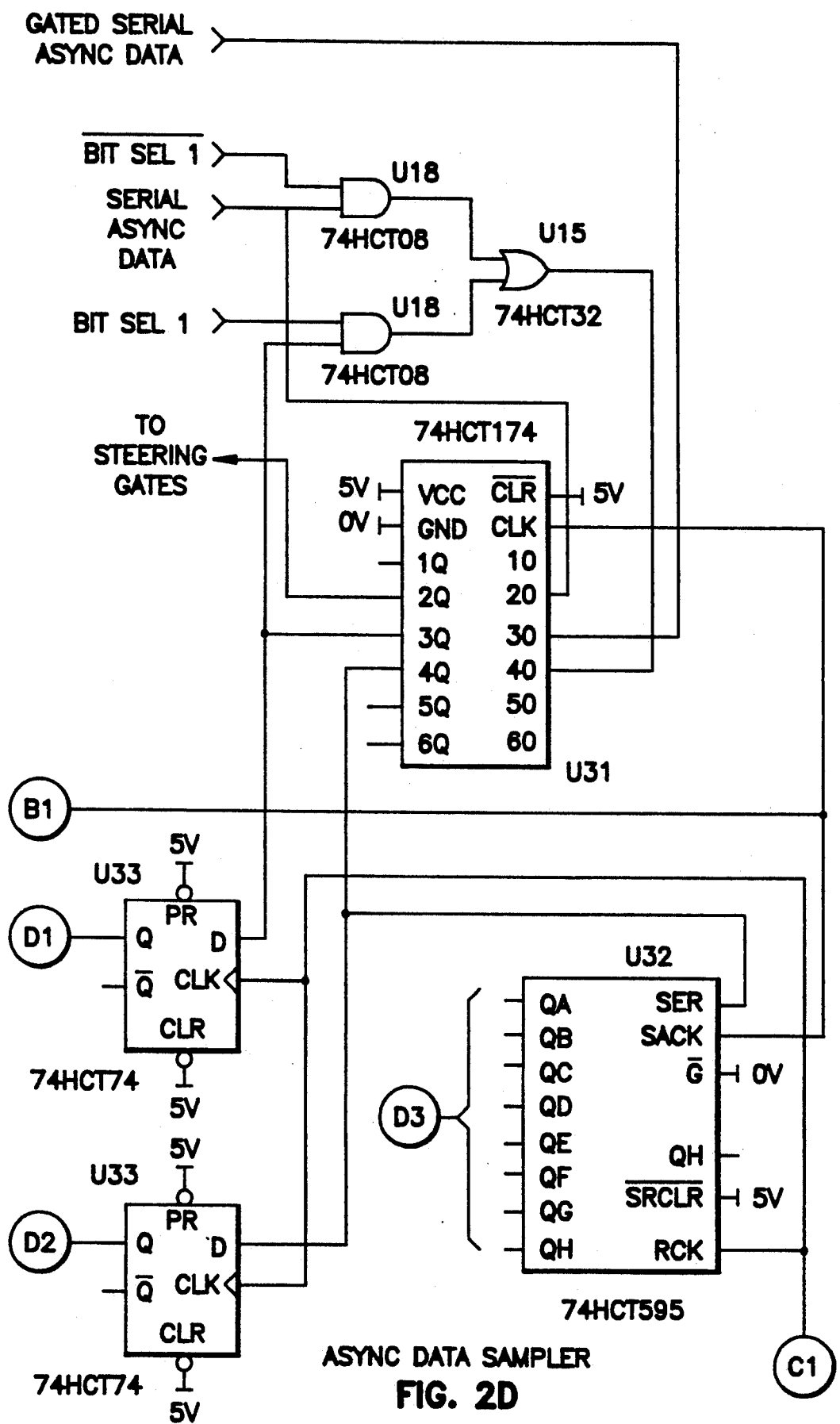

FIG. 2D shows a detailed schematic diagram representation of Async Data Sampler 18, which exhibits the asynchronous data bit and character capture function.

Figure 2E:
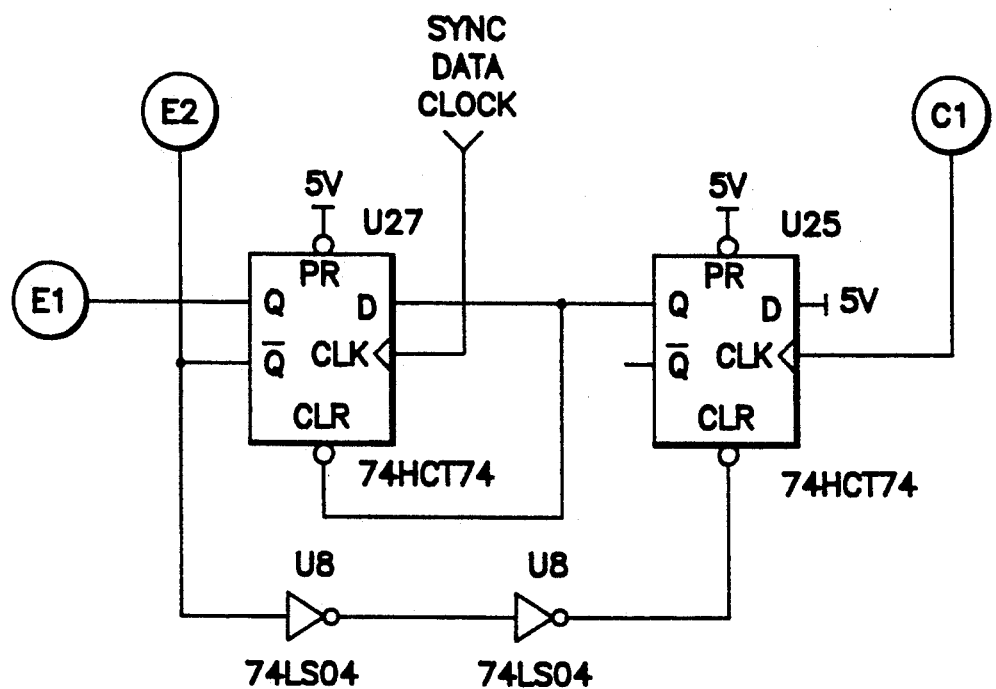

FIG. 2E shows a detailed schematic diagram representation of Data Ready Flag 20, which exhibits the character communication interface between asynchronous control and synchronous control.

Steering Gates 22 provides the logical switching and routing of the serial asynchronous data and character length selection bits based on character length selection.

Figure 2F:
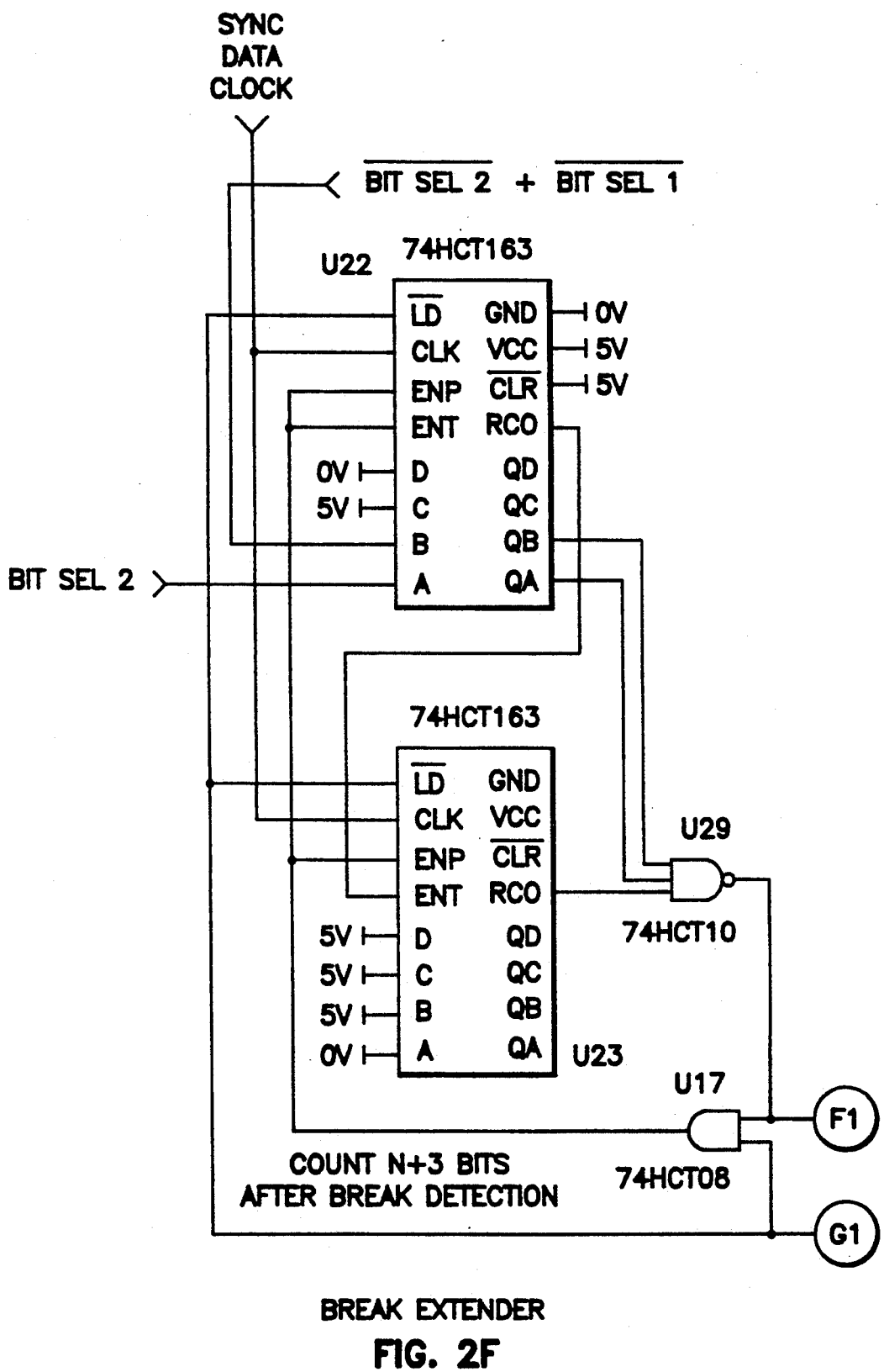

FIG. 2F shows a detailed schematic diagram representation of Break Extender 24, which exhibits the task of providing the necessary timing for break extension.

FIG. 2G shows a detailed schematic diagram representation of Break Detector 26, which exhibits the break recognition function.

FIG. 2H shows a detailed schematic diagram representation of Sync Transmitter 28, which exhibits the interface function between asynchronous character data and serial synchronous data bit communication.

AND Gate 30 provides Break Detector 26 with a switch to lock synchronous transmission to a low (zero or space) immediately upon break detection and resume synchronous transmissions after break extension.

The above-described detailed circuit is not meant to be limiting, and other equivalent circuits may be substituted if desired.

What is claimed is:

1. An apparatus for converting characters having a programmable length from asynchronous-to-synchronous form, comprising:

input means for receiving serial asynchronous data having a plurality of characters, wherein each of the characters includes at least a start bit, a programmed number of asynchronous data bits followed by a stop bit;

bit select means for inputting a bit select code indicating the number of asynchronous data bits in each of the characters;

start detector means connected to the input means and connected to receive a reset signal, for asynchronous start bit recognition on each character and for producing a start indicator in response thereto;

bit counter clock means, initialized by the start indicator, for providing clock pulses;

asynchronous bit counter means connected to receive the clock pulses, connected to receive the start indicator, and connected to receive the bit select code and connected for counting each bit of the asynchronous data bits and for producing the reset signal when a complete character is counted;

asynchronous data sampler means connected to receive the asynchronous data bits, connected to receive the clock pulses and connected to receive the bit select code, for latching each bit of the asynchronous data bits and storing the asynchronous data bits of the character;

data ready flag means connected to the asynchronous bit counter means for providing a transfer command signal when the asynchronous data sampler means contains a complete character;

break extender means connected to a break detector and connected for receiving the bit select code for timing a break extension;

the break detector means connected to the asynchronous bit counter means, connected to the break extender means, connected to receive the bit select code, and connected to the start detector means, for detecting a break signal in the serial asynchronous data and for stopping transmission of serial synchronous data in response thereto;

synchronous transmitter means connected to the asynchronous data sampler means and connected to the data ready flag means, for receiving the asynchronous data bits upon receipt of the transfer command signal and for synchronously transmitting the asynchronous data bits thereby converting the serial asynchronous data into serial synchronous data; and gate means connected to the synchronous transmitter means for providing the break detector means with a switch to stop transmission from the synchronous transmitter means immediately upon detect of a break signal in the serial asynchronous data and for restarting transmission from the synchronous transmitter means after the break extension.

2. The apparatus of claim 1, wherein the start indicator is connected for initializing and enabling the bit counter clock means, the asynchronous bit counter means, and the break detector means.

3. The apparatus of claim 1, wherein the asynchronous bit counter means and the break detector means each contain synchronous 4-bit counters with initial values determined by bit selection inputs.

4. The apparatus of claim 1, wherein the asynchronous data sampler means is further operable for storing the character in a shift register until the shift register is initialized causing the character to be transferred to a holding register in the asynchronous data sampler means.

* * * * *

UNITED STATES PATENT AND TRADEMARK OFFICE
CERTIFICATE OF CORRECTION

PATENT NO. :   5,268,934

DATED      :   December 7, 1993

INVENTOR(S) :  Sharma et al.

It is certified that error appears in the above-identified patent and that said Letters Patent is hereby corrected as shown below:

Column 6, line 38, delete "detect" and insert therefor --detection--.

Signed and Sealed this

Fourteenth Day of January, 1997

Attest:

BRUCE LEHMAN

*Attesting Officer*          *Commissioner of Patents and Trademarks*